(12) United States Patent
Walter et al.

(10) Patent No.: US 12,025,254 B2
(45) Date of Patent: Jul. 2, 2024

(54) ANTI-ROTATE HOSE CLAMP

(71) Applicant: Carlisle Fluid Technologies, LLC, Scottsdale, AZ (US)

(72) Inventors: John Walter, Wixom, MI (US); Jacob Walter, Wixom, MI (US)

(73) Assignee: Carlisle Fluid Technologies, LLC, Scottsdale, AZ (US)

( * ) Notice: Subject to any disclaimer, the term of this patent is extended or adjusted under 35 U.S.C. 154(b) by 0 days.

(21) Appl. No.: 18/270,943

(22) PCT Filed: Jan. 6, 2022

(86) PCT No.: PCT/US2022/011444
§ 371 (c)(1),
(2) Date: Jul. 5, 2023

(87) PCT Pub. No.: WO2023/003594
PCT Pub. Date: Jan. 26, 2023

(65) Prior Publication Data
US 2024/0027005 A1 Jan. 25, 2024

Related U.S. Application Data

(60) Provisional application No. 63/225,158, filed on Jul. 23, 2021.

(51) Int. Cl.
*F16L 3/12* (2006.01)
*F16L 33/10* (2006.01)
*F16L 33/12* (2006.01)

(52) U.S. Cl.
CPC .............. *F16L 33/12* (2013.01); *F16L 33/10* (2013.01)

(58) Field of Classification Search
CPC ......... F16L 33/12; F16L 33/10; F16L 27/127; F16L 27/12751
USPC .............................. 285/114, 115, 116, 23, 24
See application file for complete search history.

(56) References Cited

U.S. PATENT DOCUMENTS

| | | | | |
|---|---|---|---|---|
| 3,249,370 | A * | 5/1966 | Brogden | F16L 55/005 24/485 |
| 3,664,688 | A * | 5/1972 | Loach | F16L 37/54 285/24 |
| 5,732,744 | A * | 3/1998 | Barr | F17C 13/04 248/65 |
| 5,771,934 | A | 6/1998 | Warshawsky | |
| 7,163,238 | B1 | 1/2007 | Mittersteiner et al. | |
| 7,402,000 | B2 * | 7/2008 | Bastesen | F16L 1/12 166/344 |
| 9,200,654 | B1 * | 12/2015 | Parduhn | F16B 2/08 |
| 9,649,754 | B1 | 5/2017 | Chalmers | |
| 10,751,558 | B2 * | 8/2020 | Young | F16L 23/06 |
| 11,038,305 | B1 | 6/2021 | Sampaio et al. | |
| 11,415,248 | B2 * | 8/2022 | Berbiano | F16L 37/1225 |
| 2002/0084652 | A1 | 7/2002 | Halbrock et al. | |
| 2004/0046089 | A1 | 3/2004 | Kirschner | |
| 2020/0072260 | A1 | 3/2020 | Logan et al. | |

* cited by examiner

*Primary Examiner* — David Bochna
(74) *Attorney, Agent, or Firm* — Peter J. Beardsley

(57) ABSTRACT

A clamp wherein the clamp is configured to prevent relative rotation of a plurality of hose portions at an interface of the hose portions, can include a base plate; a collar configured to attach to a first hose portion and slidably attached to the base plate; and a first fork configured to attach to a first portion of the hose interface and slidably attached to the base plate.

11 Claims, 3 Drawing Sheets

ANTI-ROTATE HOSE CLAMP

CROSS REFERENCE TO RELATED APPLICATIONS

This application is a national stage application of International Application No. PCT/US 2022/011444, filed 6 Jan. 2022, which claims priority from U.S. Provisional Application 63/225,158, filed 23 Jul. 2021, which applications are incorporated herein by reference.

BACKGROUND

The present embodiments are directed to a clamp, and specifically, to a clamp configured to prevent rotation of a plurality of hose portions at a hose interface.

SUMMARY

Disclosed herein is a clamp wherein the clamp is configured to prevent relative rotation of a plurality of hose portions at an interface of the hose portions, comprising: a base plate; a collar configured to attach to a first hose portion and slidably attached to the base plate; and a first fork configured to attach to a first portion of the hose interface and slidably attached to the base plate.

DETAILED DESCRIPTION

A clamp, wherein the clamp is configured to prevent relative rotation of a plurality of hose portions at an interface of the hose portions, can include a base plate; a collar configured to attach to a first hose portion and slidably attached to the base plate; and a first fork configured to attach to a first portion of the hose interface and slidably attached to the base plate. According to certain embodiments, the clamp can further include a second fork configured to attach to a second portion of the hose interface and the base plate. In some embodiments, the clamp can provide that the collar is slidably attached to the base plate by a first plurality of collar screws. According to certain embodiments, the clamp can further provide that the first plurality of screws is within a set of spaced-apart, parallel collar notches within the base plate. According to certain embodiments, the clamp can further provide that the plurality of spaced-apart, parallel collar notches extend at least 20% of a length of the base plate. In some embodiments, the clamp can further provide that the first fork is slidably attached to the base plate by a second plurality of screws. The clamp can further provide that the second plurality of screws is within a set of spaced-apart, parallel fork notches within the base plate. In some embodiments, the clamp can further provide that the plurality of spaced-apart, parallel fork notches extend at least 20% of a length of the base plate. According to certain embodiments, the clamp can further provide that the collar includes a substantially semi-circular top portion, wherein the substantially semi-circular top portion comprises a substantially semi-circular inner surface. The clamp can further provide that the collar comprises a removably attached collar base, wherein the collar base is configured to attach the semi-circular top portion by a second plurality of collar screws. In some embodiments, the clamp can further provide that the first collar base includes a semi-circular collar base inner surface. According to certain embodiments, the clamp can further provide that the second fork includes a second fork semi-circular portion, wherein the second fork semicircular portion is between two straight second fork arms. The clamp can further provide that the second fork semicircular portion includes at least three second fork holes configured for screw attachment to the base plate through a set of second fork notches. In some embodiments, the clamp can further provide that the base plate includes a curved extension, wherein the second fork is configured to attach to the curved extension. According to certain embodiments, the clamp can further provide that the second fork notches extend laterally along a width of the base plate and are thereby configured to attach to the second portion of the hose interface by the second fork straight arms at any of 30 degrees of rotation.

Figure 1:
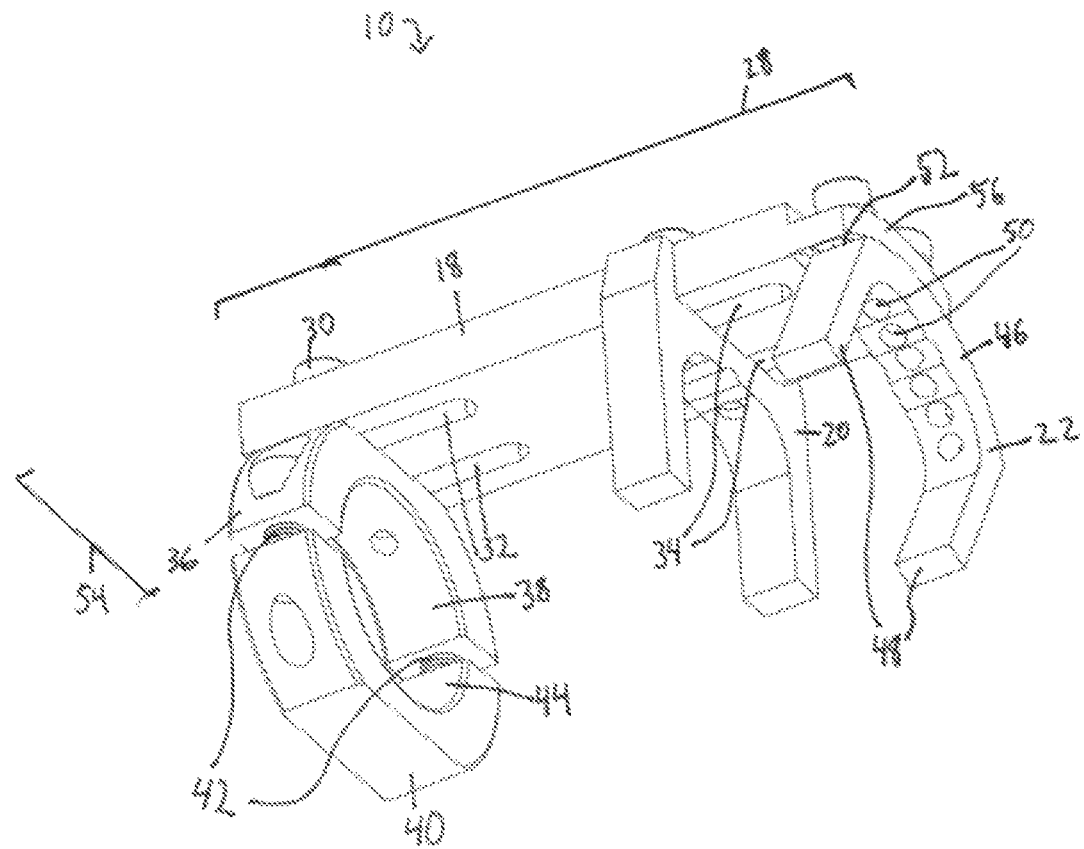
FIG. 1 is a side-skew view of the embodiments disclosed herein.

FIG. 1 is a side-skew view of the embodiments disclosed herein. As shown in FIG. 1, a clamp 10, wherein the clamp 10 is configured to prevent relative rotation of a plurality of hose portions 12, 14 at an interface 16 of the hose portions 12, 14, can include a base plate 18; a collar configured to attach to a first hose portion and slidably attached to the base plate 18; and a first fork 20 configured to attach to a first portion of the hose interface 24 and slidably attached to the base plate 18. According to certain embodiments, the clamp 10 can further include a second fork 22 configured to attach to a second portion of the hose interface 26 and the base plate 18. In some embodiments, the clamp 10 can provide that the collar is slidably attached to the base plate 18 by a first plurality of collar screws 30. According to certain embodiments, the clamp 10 can further provide that the first plurality of screws is within a set of spaced-apart, parallel collar notches 32 within the base plate 18. According to certain embodiments, the clamp 10 can further provide that the plurality of spaced-apart, parallel collar notches 32 extend at least 20% of a length 28 of the base plate 18. In some embodiments, the clamp 10 can further provide that the first fork 20 is slidably attached to the base plate 18 by a second plurality of screws. The clamp can further provide that the second plurality of screws is within a set of spaced-apart, parallel fork notches 34 within the base plate 18. In some embodiments, the clamp 10 can further provide that the plurality of spaced-apart, parallel fork notches 34 extend at least 20% of a length 28 of the base plate 18. According to certain embodiments, the clamp 10 can further provide that the collar includes a substantially semi-circular top portion 36, wherein the substantially semi-circular top portion 36 comprises a substantially semi-circular inner surface 38. The clamp 10 can further provide that the collar comprises a removably attached collar base 40, wherein the collar base 40 is configured to attach the semi-circular top portion 36 by a second plurality of collar screws 42. In some embodiments, the clamp 10 can further provide that the first collar base 40 includes a semi-circular collar base 40 inner surface. According to certain embodiments, the clamp 10 can further provide that the second fork 22 includes a second fork semi-circular portion 46, wherein the second fork 22 semicircular portion is between two straight second fork arms 48. The clamp 10 can further provide that the second fork 22 semicircular portion includes at least three second fork holes 50 configured for screw attachment to the base plate 18 through a set of second fork notches 52. In some embodiments, the clamp 10 can further provide that the base plate 18 includes a curved extension 56, wherein the second fork 22 is configured to attach to the curved extension 56. According to certain embodiments, the clamp 10 can further provide that the second fork notches 52 extend laterally along a width 54 of the base plate 18 and are thereby configured to attach to the second portion of the hose interface 26 by the second fork 22 straight arms at any of 30 degrees of rotation.

Figure 2:
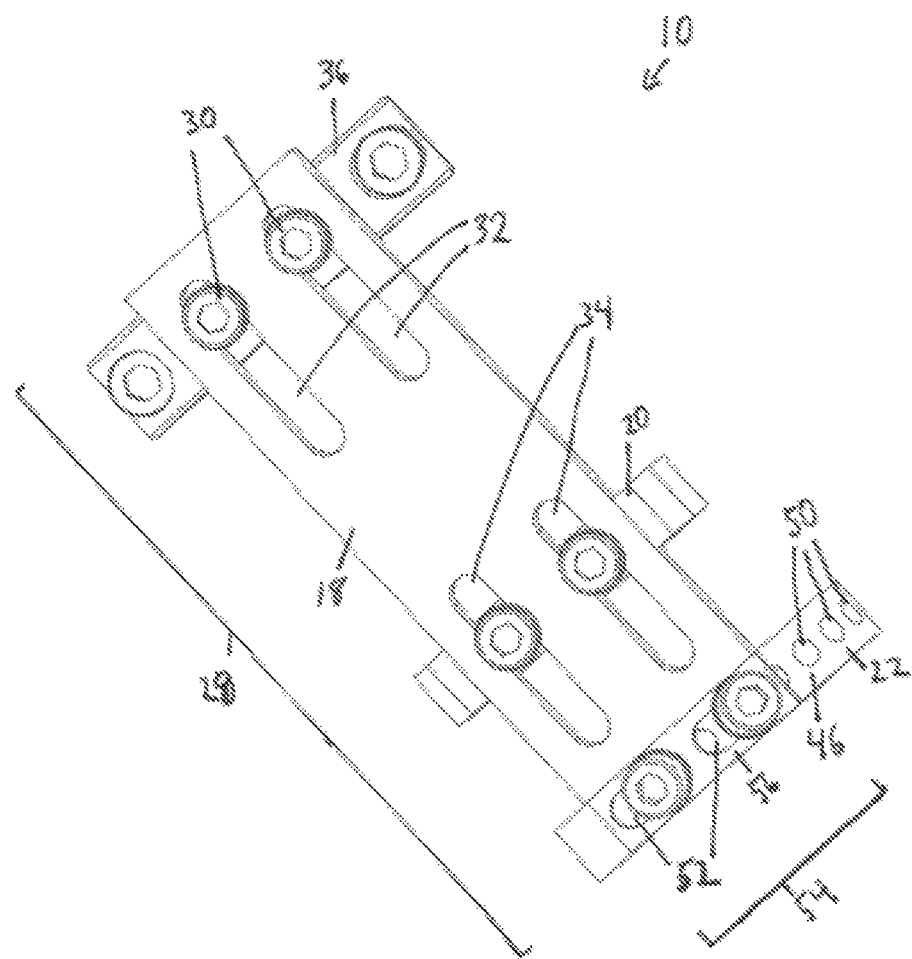
FIG. 2 is a top view of the embodiments disclosed herein.

FIG. 2 is a top view of the embodiments disclosed herein. As shown in FIG. 2, a clamp wherein the clamp 10 is configured to prevent relative rotation of a plurality of hose portions 12, 14 at an interface 16 of the hose portions 12, 14, can include a base plate 18; a collar configured to attach to a first hose portion and slidably attached to the base plate 18; and a first fork 20 configured to attach to a first portion of the hose interface 24 and slidably attached to the base plate 18. According to certain embodiments, the clamp 10 can further include a second fork 22 configured to attach to a second portion of the hose interface 26 and the base plate 18. In some embodiments, the clamp 10 can provide that the collar is slidably attached to the base plate 18 by a first plurality of collar screws 30. According to certain embodiments, the clamp 10 can further provide that the first plurality of screws is within a set of spaced-apart, parallel collar notches 32 within the base plate 18. According to certain embodiments, the clamp 10 can further provide that the plurality of spaced-apart, parallel collar notches 32 extend at least 20% of a length 28 of the base plate 18. In some embodiments, the clamp 10 can further provide that the first fork 20 is slidably attached to the base plate 18 by a second plurality of screws. The clamp 10 can further provide that the second plurality of screws is within a set of spaced-apart, parallel fork notches 34 within the base plate 18. In some embodiments, the clamp 10 can further provide that the plurality of spaced-apart, parallel fork notches 34 extend at least 20% of a length 28 of the base plate 18. According to certain embodiments, the clamp 10 can further provide that the collar includes a substantially semi-circular top portion 36, wherein the substantially semi-circular top portion 36 comprises a substantially semi-circular inner surface 38. The clamp 10 can further provide that the collar comprises a removably attached collar base 40, wherein the collar base 40 is configured to attach the semi-circular top portion 36 by a second plurality of collar screws 42. In some embodiments, the clamp 10 can further provide that the first collar base 40 includes a semi-circular collar base 40 inner surface. According to certain embodiments, the clamp 10 can further provide that the second fork 22 includes a second fork semi-circular portion 46, wherein the second fork 22 semicircular portion is between two straight second fork arms 48. The clamp 10 can further provide that the second fork 22 semicircular portion includes at least three second fork holes 50 configured for screw attachment to the base plate 18 through a set of second fork notches 52. In some embodiments, the clamp 10 can further provide that the base plate 18 includes a curved extension 56, wherein the second fork 22 is configured to attach to the curved extension 56. According to certain embodiments, the clamp 10 can further provide that the second fork notches 52 extend laterally along a width 54 of the base plate 18 and are thereby configured to attach to the second portion of the hose interface 26 by the second fork 22 straight arms at any of 30 degrees of rotation.

Figure 3:
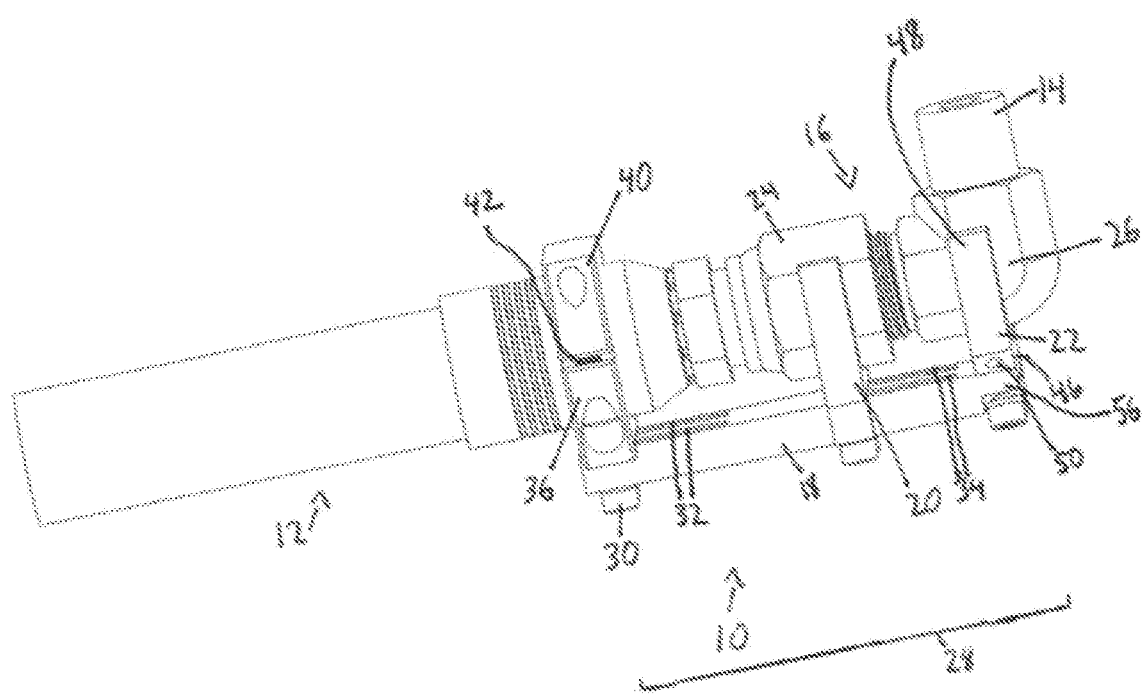
FIG. 3 is a side view of the embodiments disclosed herein attached to plurality of hose portions at a hose interface.

FIG. 3 is a side view of the embodiments disclosed herein attached to plurality of hose portions 12, 14 at a hose interface 16. As shown in FIG. 3, a clamp 10, wherein the clamp 10 is configured to prevent relative rotation of a plurality of hose portions 12, 14 at an interface 16 of the hose portions 12, 14, can include a base plate 18; a collar configured to attach to a first hose portion and slidably attached to the base plate 18; and a first fork 20 configured to attach to a first portion of the hose interface 24 and slidably attached to the base plate 18. According to certain embodiments, the clamp 10 can further include a second fork 22 configured to attach to a second portion of the hose interface 26 and the base plate 18. In some embodiments, the clamp can provide that the collar is slidably attached to the base plate 18 by a first plurality of collar screws 30. According to certain embodiments, the clamp 10 can further provide that the first plurality of screws is within a set of spaced-apart, parallel collar notches 32 within the base plate 18. According to certain embodiments, the clamp 10 can further provide that the plurality of spaced-apart, parallel collar notches 32 extend at least 20% of a length 28 of the base plate 18. In some embodiments, the clamp 10 can further provide that the first fork 20 is slidably attached to the base plate 18 by a second plurality of screws. The clamp 10 can further provide that the second plurality of screws is within a set of spaced-apart, parallel fork notches 34 within the base plate 18. In some embodiments, the clamp 10 can further provide that the plurality of spaced-apart, parallel fork notches 34 extend at least 20% of a length 28 of the base plate 18. According to certain embodiments, the clamp 10 can further provide that the collar includes a substantially semi-circular top portion 36, wherein the substantially semi-circular top portion 36 comprises a substantially semi-circular inner surface 38. The clamp 10 can further provide that the collar comprises a removably attached collar base 40, wherein the collar base 40 is configured to attach the semi-circular top portion 36 by a second plurality of collar screws 42. In some embodiments, the clamp 10 can further provide that the first collar base 40 includes a semi-circular collar base inner surface. According to certain embodiments, the clamp 10 can further provide that the second fork 22 includes a second fork semi-circular portion 46, wherein the second fork 22 semicircular portion is between two straight second fork arms 48. The clamp 10 can further provide that the second fork 22 semicircular portion includes at least three second fork holes 50 configured for screw attachment to the base plate 18 through a set of second fork notches 52. In some embodiments, the clamp 10 can further provide that the base plate 18 includes a curved extension 56, wherein the second fork 22 is configured to attach to the curved extension 56. According to certain embodiments, the clamp 10 can further provide that the second fork notches 52 extend laterally along a width 54 of the base plate 18 and are thereby configured to attach to the second portion of the hose interface 26 by the second fork 22 straight arms at any of 30 degrees of rotation.

EMBODIMENTS

According to a first embodiment, provided is a clamp, wherein the clamp is configured to prevent relative rotation of a plurality of hose portions at an interface of the hose portions, comprising: a base plate; a collar configured to attach to a first hose portion and slidably attached to the base plate; and a first fork configured to attach to a first portion of the hose interface and slidably attached to the base plate.

The first embodiment can further include a second fork configured to attach to a second portion of the hose interface and the base plate.

The first or any previous or subsequent embodiments can further provide that the collar is slidably attached to the base plate by a first plurality of collar screws.

The first or any previous or subsequent embodiments can further provide that the first plurality of screws is within a set of spaced-apart, parallel collar notches within the base plate.

The first or any previous or subsequent embodiments can further provide that the plurality of spaced-apart, parallel collar notches extend at least 20% of a length of the base plate.

The first or any previous or subsequent embodiments can further provide that the first fork is slidably attached to the base plate by a second plurality of screws.

The first or any previous or subsequent embodiments can further provide that the second plurality of screws is within a set of spaced-apart, parallel fork notches within the base plate.

The first or any previous or subsequent embodiments can further provide that the plurality of spaced-apart, parallel fork notches extend at least 20% of a length of the base plate.

The first or any previous or subsequent embodiments can further provide that the collar comprises a substantially semi-circular top portion, wherein the substantially semi-circular top portion comprises a substantially semi-circular inner surface.

The first or any previous or subsequent embodiments can further provide that the collar comprises a removably attached collar base, wherein the collar base is configured to attach the semi-circular top portion by a second plurality of collar screws.

The first or any previous or subsequent embodiments can further provide that the first collar base comprises a semi-circular collar base inner surface.

The first or any previous or subsequent embodiments can further provide that the second fork comprises a second fork semi-circular portion, wherein the second fork semicircular portion is between two straight second fork arms.

The first or any previous or subsequent embodiments can further provide that the second fork semicircular portion comprises at least three second fork holes configured for screw attachment to the base plate through a set of second fork notches.

The first or any previous or subsequent embodiments can further provide that the base plate comprises a curved extension, wherein the second fork is configured to attach to the curved extension.

The first or any previous or subsequent embodiments can further provide that the second fork notches extend laterally along a width of the base plate and are thereby configured to attach to the second portion of the hose interface by the second fork straight arms at any of 30 degrees of rotation.

We claim:

1. A clamp, wherein the clamp is configured to prevent relative rotation of a plurality of hose portions at an interface of the hose portions, comprising:
   a base plate;
   a collar configured to attach to a first hose portion and slidably attached to the base plate;
   a first fork configured to attach to a first portion of the hose interface and slidably attached to the base plate; and
   a second fork configured to attach to a second portion of the hose interface and the base plate,
   wherein the collar is slidably attached to the base plate by a first plurality of collar screws,
   wherein the second fork comprises a second fork semi-circular portion, wherein the second fork semicircular portion is between two straight second fork arms.

2. The clamp of claim 1, wherein the first plurality of screws is within a set of spaced-apart, parallel collar notches within the base plate.

3. The clamp of claim 2, wherein the plurality of spaced-apart, parallel collar notches extend at least 20% of a length of the base plate.

4. The clamp of claim 1, wherein the first fork is slidably attached to the base plate by a second plurality of screws.

5. The clamp of claim 4, wherein the second plurality of screws is within a set of spaced-apart, parallel fork notches within the base plate.

6. The clamp of claim 5, wherein the plurality of spaced-apart, parallel fork notches extend at least 20% of a length of the base plate.

7. The clamp of claim 1, wherein the collar comprises a substantially semi-circular top portion, wherein the substantially semi-circular top portion comprises a substantially semi circular inner surface.

8. The clamp of claim 7, wherein the collar comprises a removably attached collar base, wherein the collar base is configured to attach the semi-circular top portion by a second plurality of collar screws.

9. The clamp of claim 8, wherein the first collar base comprises a semi-circular collar base inner surface.

10. The clamp of claim 1, wherein the second fork semicircular portion comprises at least three second fork holes configured for screw attachment to the base plate through a set of second fork notches.

11. The claim of claim 10, wherein the base plate comprises a curved extension, wherein the second fork is configured to attach to the curved extension.

* * * * *